Patented Nov. 10, 1936

2,060,281

UNITED STATES PATENT OFFICE 2,060,281

PROCESS FOR BREAKING PETROLEUM EMULSIONS

Edwin E. Claytor, Tulsa, Okla.

No Drawing. Application March 20, 1933, Serial No. 661,841

5 Claims. (Cl. 196—4)

This invention relates to a process for separating water and aqueous solutions of various salts and acids from hydrocarbons with which they are more or less permanently emulsified, more particularly those emulsions encountered in the petroleum industry, especially the emulsions of crude petroleum with the naturally occurring brines.

Petroleum emulsions contain varying amounts of oil, water, or brine and colloidal matter and are of a relatively permanent nature, due to the stabilizing effect of the colloidal matter. Such emulsions are the natural petroleum emulsions produced in oil fields and the emulsions which settle in storage tanks and accumulate in tank farms and oil refineries. They are variously known as "cut-oil", "roily-oil", "turbid oil", "wet oil", "emulsified oil", "basic sediment", "bottom settlings", "B. S.", "sludge", etc.

It is an object of my invention to provide a process employing a novel agent for breaking or separating such petroleum emulsions which is distinguished from prior chemical compounds heretofore used for breaking such emulsions, in that it consists of a polymerization product derived from vegetable oils.

It is also an object of my invention to provide the hereinafter described process of producing the treating agent hereinafter referred to.

I have discovered that practically all of the lower priced vegetable oils, such as cotton-seed oil, corn oil, etc., can be improved to such an extent through the hereinafter described polymerization process, that when sulphonated, produce treating agents as effective as the more expensive castor oil commonly employed as a base for emulsion treating compounds. Moreover, when castor oil is subjected to the treatment herein defined it will produce a treating agent more effective than castor oil that has not been previously polymerized.

In producing my treating agent, any one of the partially refined vegetable oils, such as prime summer yellow cotton seed oil, corn oil, or a mixture of two or more of such refined vegetable oils may be used. The oil is first polymerized by heating it at atmospheric pressure to its boiling point, which varies according to the kind of oil, from 200° to 300° C. After reaching the boiling point, the oil is boiled briskly for a period of time varying from one minute to as much as sixty minutes, depending on how much polymerization is desired. Some oils polymerize more quickly than others, for instance, cotton-seed oil will require only ten to fifteen minutes to attain a certain degree of polymerization, while castor oil to acquire the same degree of polymerization requires twenty to thirty minutes. Reflux condensers may be attached to the still or the vapors may be burned under the still.

After polymerization of the oil by heating as described, it is then blown with air and/or oxygen while maintaining the temperature of the oil at 105° C. to 120° C. for one to twenty-four hours; the air being admitted through a perforated pipe placed in the bottom of the vessel so that it will be divided into many fine streams.

After the oil is thus polymerized and blown, it is cooled to 10° C. or lower and sulphonated with either concentrated sulphuric acid of 66° Baumé or with oleum (fuming sulphuric acid containing from 1% to as high as 25% $SO_3$). The acid is added very slowly and the mass is cooled in the usual manner in order to keep the temperature of the mass from exceeding 40° C. during sulphonation. The amount of acid used may vary from fifteen percent to as high as thirty percent by weight.

After all the acid has been added with thorough mixing and cooling to 50° C. or less, the mixing or agitation is continued for one to two hours with cooling to 50° C. or less to insure a thorough sulphonation.

The sulphonated mass is then mixed with twice its volume of an aqueous solution of sodium sulphate of 4° to 6° Baumé, thoroughly agitated therewith for at least thirty minutes and then allowed to stand for 12 to 24 hours, after which time the excess acid will have settled to the bottom in the aqueous solution of sodium sulphate. This aqueous solution containing the excess acid is then drawn off and the acid mass is then neutralized by means of caustic soda, potash or ammonia. However, the water-insoluble salts, such as calcium or magnesium salts, or the esters, such as the methyl or ethyl ester, can be employed.

Treating agents as described above may be prepared from any one of the partially refined vegetable oils such as prime summer yellow cotton seed oil, refined corn oil, cold pressed castor oil, etc., but I prefer to use a mixture of polymerized castor oil with one or more of the other polymerized vegetable oils, for two reasons.—1st, polymerized castor oil is a very superior treating agent and 2nd, its admixture with other polymerized vegetable oils produces treating agents having a lower "cold point" than those containing no polymerized castor oil. In other words, they will not congeal above —15° C. if 33% or more polymerized castor oil is used, and therefore can be fed through gravity feed apparatus (lubricators, etc.) in cold weather without requiring some means of preventing them from congealing, such as mixing with alcohol or providing some means of keeping the apparatus warm.

As a specific example of my process of producing the treating agent, I polymerize by heating, each one of the following oils separately until it begins to boil briskly; and continue the boiling for 10 minutes, burning the vapors that come off. Each oil must be polymerized separately because of the difference in boiling points.

After the oils have been thus polymerized, I take, for example, 34 parts by weight of polymerized castor oil, 33 parts of polymerized cotton seed oil and 33 parts of polymerized corn oil and mix them together and blow air and/or oxygen in several fine streams through them while maintaining the temperature of the oils between 105° C. and 120° C. for four hours.

The oils are then placed in a suitable sulphonator and after cooling to about 10° C., fuming sulphuric acid containing 10% $SO_3$ is run in very slowly in a fine stream while mixing or agitating the oils, maintaining the temperature of the oils below 40° C. by means of a chilled brine circulated through a water-jacket or coil in the sulphonator. When the oils have received 25 per cent by weight of the fuming acid, no more acid is run in, but the agitation or mixing is continued with cooling maintained between 35° C. and 40° C. for one hour. The acidified mass is then washed with twice its volume of an aqueous solution of sodium sulphate of 4° to 6° Baumé gravity in order to wash out the excess or uncombined acid. After agitating this solution with the acidified mass for thirty minutes, the whole is left standing for 12 to 24 hours and then the wash solution is drawn off from the bottom.

The supernatant sulphonated oil is now neutralized by means of an aqueous solution of ammonia of about 26° Baumé.

The agent herein described may be brought into contact with an emulsion to be treated, either by introducing the treating agent into a well in which a petroleum emulsion is being produced, into a conduit through which a petroleum emulsion is flowing, into a tank in which a petroleum emulsion is stored, or into a container that holds the sludge obtained from the bottom of an oil storage tank.

It can even be introduced into a producing well in such a way that it will become mixed with water or oil that is emerging from the ground before said water and oil enter the barrel of the well pump or the tubing up through which said water and oil flow to the surface of the ground. After any of the various treatments above referred to, the emulsion is allowed to stand in a quiescent state at a suitable temperature, so as to permit the water or brine to separate from the oil or it may be passed through a variety of apparatus, such as hay tanks, gun barrels, etc., such as are now commonly used for "breaking" petroleum emulsions. It may even be passed through a heating apparatus, a centrifugal or electrical dehydrator, or an emulsifying device with or without the addition of water to the emulsion, or it may be subjected to action by a combination of two or more of the devices referred to.

What I claim and desire to secure by Letters Patent is:

1. The process of breaking petroleum emulsions including treating the emulsions with an agent consisting of a polymerized, blown and sulphonated vegetable oil.

2. The process of breaking a petroleum emulsion of water in oil type including mixing with the emulsion a treating agent consisting of polymerized, blown and sulphonated vegetable oil, and permitting the petroleum oil and water components of the emulsion to separate by gravity.

3. The process of breaking an emulsion of petroleum oil and water including mixing with the emulsion a treating agent consisting of sulphonated, heat polymerized cotton seed oil, and polymerized castor oil, and permitting the petroleum oil and water components of the emulsion to separate by gravity.

4. The process of breaking an emulsion of petroleum oil and water including mixing with the emulsion a treating agent consisting of a sulphonated mixture of different polymerized vegetable oils in the proportion of approximately sixty-five parts by weight of one polymerized vegetable oil to thirty-five parts by weight of a different polymerized vegetable oil, and permitting the petroleum oil and water components of the emulsion to separate by gravity.

5. The process of breaking a petroleum emulsion of water in oil type including mixing with the emulsion a treating agent consisting of a sulphonated mixture of approximately sixty-five parts by weight of polymerized cotton seed oil and thirty-five parts by weight of polymerized castor oil, and permitting the petroleum and water components of the emulsion to separate by gravity.

EDWIN E. CLAYTOR.